United States Patent [19]

Vye

[11] Patent Number: 4,720,805
[45] Date of Patent: Jan. 19, 1988

[54] COMPUTERIZED CONTROL SYSTEM FOR THE PAN AND TILT FUNCTIONS OF A MOTORIZED CAMERA HEAD

[76] Inventor: Scott R. Vye, 133 Wadsworth Ave., #3, Santa Monica, Calif. 90405

[21] Appl. No.: 807,175

[22] Filed: Dec. 10, 1985

[51] Int. Cl.$^4$ .................. G06F 15/00; H04N 5/00
[52] U.S. Cl. .................. 364/525; 364/167; 352/197; 352/243; 358/229; 354/74
[58] Field of Search .................. 364/167–171, 364/474, 475, 525; 248/550; 352/197, 243, 53, 90; 354/74; 358/229, 210

[56] References Cited

U.S. PATENT DOCUMENTS

| | | | |
|---|---|---|---|
| 3,164,838 | 1/1965 | Heinrich | 352/243 |
| 3,984,628 | 10/1976 | Sharp | 358/210 |
| 4,120,004 | 10/1978 | Coutta | 358/229 |
| 4,123,782 | 10/1978 | Kitahara | 358/210 |
| 4,152,722 | 5/1979 | Inuiya | 358/210 |
| 4,218,702 | 8/1980 | Brocard | 354/74 |
| 4,244,006 | 1/1981 | Kitahara | 358/210 |
| 4,283,766 | 8/1981 | Snyder | 364/525 |
| 4,413,314 | 11/1983 | Slater | 364/188 |
| 4,566,036 | 1/1986 | Kadosawa | 358/228 |
| 4,625,938 | 12/1986 | Brown | 352/197 |
| 4,627,003 | 12/1986 | Kishi et al. | 364/191 |

FOREIGN PATENT DOCUMENTS

| | | | |
|---|---|---|---|
| 2702988 | 7/1978 | Fed. Rep. of Germany | 352/243 |
| 0208605 | 11/1984 | Japan | 364/190 |

Primary Examiner—Jerry Smith
Assistant Examiner—Allen MacDonald
Attorney, Agent, or Firm—Keith D. Beecher

[57] ABSTRACT

A computerized motion control system for panning and tilting a television camera, motion picture camera or any other type of camera. The system includes a motorized camera head upon which a camera is mounted. The system also includes a digitizing tablet on which an observer follows the action transpiring before the camera with an electronic stylus by moving the stylus across the plane surface of the tablet. The resulting digital signals generated by the tablet and electronic stylus are fed to a computer in which they are converted to pan-and-tilt signals which are fed to the motorized camera head upon which the camera is mounted. The digital pan-and-tilt signals are converted to analog signals, and the analog signals activate pan-and-tilt camera head motors causing them to point the camera to a location determined by the operator by his placement of the electronic stylus on the digitizing tablet. In a second embodiment the digitizing tablet is replaced by a digital touch screen which is placed on a monitor and which carries the picture from the camera being controlled.

5 Claims, 3 Drawing Figures

COMPUTERIZED CONTROL SYSTEM FOR THE PAN AND TILT FUNCTIONS OF A MOTORIZED CAMERA HEAD

BACKGROUND OF THE INVENTION

In the television and film industries there are many situations due to hazards, space limiations, or other areas of special application where it becomes necessary to operate a camera from a remote location. The camera operator cannot move the camera about using the usual handle attached to the camera head upon which it is normally mounted.

The panning and tilting of the camera now must be accomplished by using a motorized camera head. The camera head is controlled by an operator who causes the pan-and-tilt motors on the camera head to receive controlling analog electrical currents by means of a joystick or other variable resistance potentiometers.

It is the present practice for the camera operator to observe a monitor which carries a picture from the camera mounted on the motorized camera head and, using that picture as a feedback device, to pan and tilt the camera about with a joystick or other aformentioned variable reistance potentiometers.

It is obvious that there are limits in the prior art of the ability of the camera operator to pan and tilt the camera smoothly and proportional to the action transpiring before it using the "direct analog system" described above which currently represents the state-of-the art design for the remote control of a camera head with respect to pan-and-tilt. Such systems often produce a mechanical and often jerky effect and fail to reproduce the distinctly sensitive and subtle "human" qualities that are intuitively recognized as the result of an experienced camera operator moving his camera about with his hand directly on a handle connected to the camera head.

In broadcast sports television today, where remote cameras are used in places, for example, as on a goal post at a football game, such cameras are operated by camera operators (as described above) watching monitors feeding from the camera mounted on the goal post and then panning and tilting that camera with a joystick. Because of the rapidity and capriciousness of the activity associated with the game of football, it is extremely difficult for the camera operator using this "direct analog system" to pan-and-tilt the camera smoothly, quickly and accurately enough to follow the action in what could be descrtibed as an aesthetically pleasing manner. More often, the camera work is jerky and relevant action is easily lost out of frame. The usual strategy for dealing with these problems is to zoom the lens out to a wide angle setting which makes it easier for the camera operator but which comprises the shot by making the players on the field appear to be disproportionately small and therefore difficult for the viewer to discern what exactly is taking place.

Similar difficulties confront the filmaker. Cameras are often put on unmanned cranes and must be operated from remote locations by operators manipulating wheels that are geared to potentiometers which control the electrical current sent to the motors responsible for panning and tilting the camera head. Using as his feedback the picture from a monitor which is fed to a signal from a "video assist" camera mounted to the film camera viewfinder, the camera operator spins the pan-and-tilt wheels back and forth as the camera is moved around on the crane in a virtually three-dimensional space attempting to keep the action transpiring before the camera properly framed. As mentioned previously, the "direct analog systems" which are currently the only option available to the broadcast and film industries makes it exceedingly difficult for the operator to reproduce the same quality of camera work that is associated with direct contact with the camera.

There is an abundance of existing technology, particularly in the motion picture field, for the control of cameras using computers and digital control methods. However, these prior art systems are usually "non-real-time" motion control systems used for filming special effects on virtually a frame-by-frame basis. In other prior art systems involving computerized camera motion control for scenes shot in real time, the camera movements are entered into the computer before the shot and recalled as the shot transpires. Although such shots may be modified as the action transpires by entering certain commands into the computer via the computer's keyboard, such prior art systems of computerized camera control bear no resemblance to the system of the present invention which includes a digitizer (digitizng tablet and/or digital touch-screen) input to the computer.

The system of the invention has many significant advantages over the "direct analog systems" which prevail today. The most significant of these advantages is the restoration of the inimitable character of "human" appearance to the character of the shot emanating from the cameras controlled by the system of the invention. The camera operator now pans and tilts the camera mounted on the motorized camera head with either an electronic stylus he holds in his hand and slides across the surface of a digitizing tablet, or with his finger by moving his finger about the surface of a digital touch-screen monitor that has on it a direct picture feeding from the camera or video assist camera that is on the motorized camera head. With the variable resistance potentiometers now eliminated from the system and, therefore, the awkward motorized camera head pan-and-tilt movements that they cause (such as a general non-linear motor responsiveness in relationship to the amount of electrical current applied which results in lag, over and/or under acceleration, limited top speed, jerkyness, etc.), the camera operator is now capable of restoring to the camera movement the intricate and subtle human qualities that will arise from the very precise and direct relationship the present system of the invention permits by virtue of the direct digital input to the computer program emanating from the skilled and artistic movements of his hand with the electronic stylus or his finger on the digital touch-screen.

Additionally, the digital output from the computer to the pan and tilt motors on the motorized camera head in the system of the invention are received by motor positioning devices currently available (such as stepper motor controllers or digital-to-analog motor positioners) and these positioning devices will cause the pan and tilt motors on the motorized camera head to respond precisely and accurately without the above-described problems associated with direct analog current control from variable resistance potentiometers. Therefore, the skilled and artistic movements of the camera operator's hand and/or finger are not negated by the unpredictable behavior of motors subject to direct analog current control.

Another advantage of the computerized system of the present invention lies in the fact that the camera operator can plan a series of intricate camera movements in advance by marking on the digitizing tablet, or digital touch-screen, various reference marks which denote the locations actions transpiring before his camera will be. With the precision of movement afforded by the system of the invention, he can move the camera to the various locations on a timely and accurate basis without having to rely so much on feedback from the monitor which was a requirement with the "direct analog systems" wherein one does not really know where a camera will go until it gets there. Such systems rely on constant correction and compensation and trail-and-error to achieve the desired result.

Finally, a major advantage of the system of the invention lies with its ability to provide correct visual feedback for the operator when the computer program is also focusing one or more camera lenses from the digital signals generated from an electronic stylus and digitizing tablet in the system described in copending application Ser. No. 533,300 filed Sept. 19, 1983 in the name of Richard A. Vye entitled COMPUTERIZED AUTOMATIC FOCUSING CONTROL SYSTEM FOR MULTIPLE TELEVISION CAMERAS which issued Apr. 8, 1986 as U.S. Pat. No. 4,581,647.

In accordance with the system described in the copending application and the system of the present invention, the operator moves an electronic stylus across the plane surface of either an opaque or transparent digitizer and the digital signals thus generated are fed to a computer where they are compared to the pre-programmed reference location of one or more television or film camera lenses which are to be focused. The computer calculates the exact distances to the lenses and then transmits digital focusing signals to each camera location where they are received by motor positioning devices which cause the lens focus motor drive systems to move the optical focusing elements to the exact position for correct focus. To enhance the accuracy of the placement of the electronic stylus to generate the correct focusing signals, a camera is fitted to a motorized pan-and-tilt camera head in accordance with the present invention, which receives its pan-and-tilt signals from the same electronic stylus and digitizing tablet which generates the focusing signals for the other cameras. This camera is placed prependicular to the general plane of the action and the operator views a monitor feeding from it. Wherever he points the camera with the electronic stylus, it will also cause, therefore, the other camera lenses to be focused on that exact spot.

If, for example, the task to focus on a speeding drag racing car from a camera placed directly at the end of the straightaway, the individual operating the electronic stylus and digitizing tablet observes a monitor which feeds from the motorized pan-and-tilt camera head and camera which is controlled by the tablet and placed perpendicular to the straightaway. As a car goes down the straightaway, the operator moves the stylus in such a manner so as to cause the image of the car to remain centered in the monitor. As long as this remains the case, the pen is also simultaneously moving in the proper spatial and temporal relationship with respect to the car and to the camera to be focused located at the end of the straightaway. The electronic pen and the digitizer therefore are set up to send identical digital locational signals to the computer where a multi-tasking program causes the one camera's lens (or multiple camera lenses) to be focused on the exact spot where those same signals cause the computer controlled motorized pan-and-tilt camera head and camera to be pointing.

Therefore, the task of the operator of the system described in copending application Ser. No. 533,300 assigned the task of focusing the lens of a camera with a digitizer and an electronic stylus is greatly facilitated by using the system of the invention presently described, i.e. a computer controlled motorized pan-and-tilt camera head and camera which responds to the same digital signals generated to focus the primary camera. The operator receives precise visual feedback from the motorized pan-and-tilt camera and as long as he pans and tilts it is such a manner so as to keep the object chosen to be in focus in the center of the screen, then the primary camera will, in fact, be in perfect focus.

SUMMARY OF THE INVENTION

A computerized motion control system system for panning and tilting a motorized camera head (upon which may be mounted a television, film or other type camera) that receives input from a human-operated digitizing tablet equipped with an electronic stylus or which, in a second embodiment, receives input from a digital touch-screen applied to the monitor which provides visual feedback from the camera mounted on the device.

DETAILED DESCRIPTION OF THE ILLUSTRATED EMBODIMENT

Figure 1:
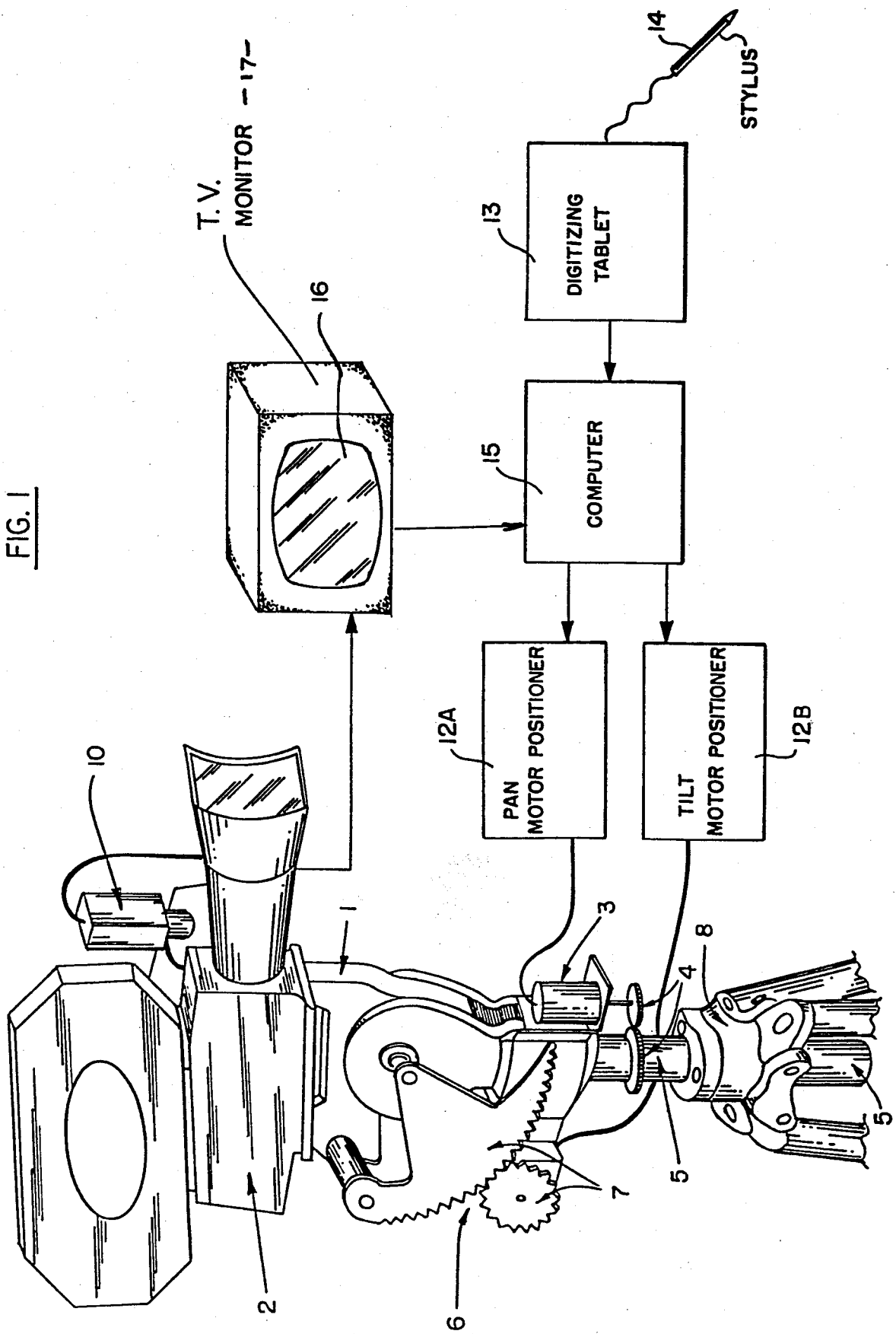
FIG. 1 is a schematic representation of an elemental system illustrative of the concepts of the present invention.

As shown, for example, in FIG. 1, the system of the invention includes a digitizing tablet 13. The digitizing tablet may be any commercially available tablet, such as the "Tiger Tablet" presently being marketed by Hitachi America, Ltd. of Torrance, Calif. The digitizing tablet 13 is equipped with an electronic stylus 14 which is intended to be moved manually across the surface presented by the top of the tablet. As the stylus 14 is moved across the plane surface, the tablet generates digital signals representative of the ordinate and coordinate positions of the stylus (X,Y). These digital signals are fed to a computer 15 which may be any commercially available computer, such as, for example, the Pinnacle 1X, which is marketed by Pinnacle Micro Systems of Dallas, Tex.

The computer 15 responds to the digital signals from the digitizing tablet 13 to produce pan-and-tilt motion control digital signals for a motorized camera head 1. Camera head 1 is equipped with a camera 2, such as, for example, an Arriflex III 35 millimeter motion picture camera. In accordance with a second embodiment of the invention, a video-assist camera 10 is provided, which picks up a video signal from the camera's viewfinder and feeds it to a monitor 17, The monitor 17 is equipped with a touch screen 16. The motorized camera head 1 is attached to a weight bearing device for stability and support, such as, for example, a tripod 8.

In accordance with the present invention, the digital pan-and-tilt signals from computer 15 are converted to analog currents in motor positioner controllers 12A and 12B, which may be, digital-to-analog converters, or the like, and currents from the motor position controllers 12A and 12B are introduced to the pan motor drive system which includes a pan drive motor 3 and gear drive transmission 4; and to the tilt motor drive system which includes a tilt drive motor 6 and a gear transmission 7. These drive systems serve to pan-and-tilt the motorized camera head 1 (and attached camera 2) which is mounted to the support device, tripod 8, by means of a center post 5.

The computer 15 is programmed to respond to the digital signals from the digitizing tablet 13 in the first embodiment, and from touch screen 16 in the second embodiment; and to perform three-dimensional trigonometric calculations which produce corresponding pan-and-tilt signals for the motorized camera head.

Figure 2:
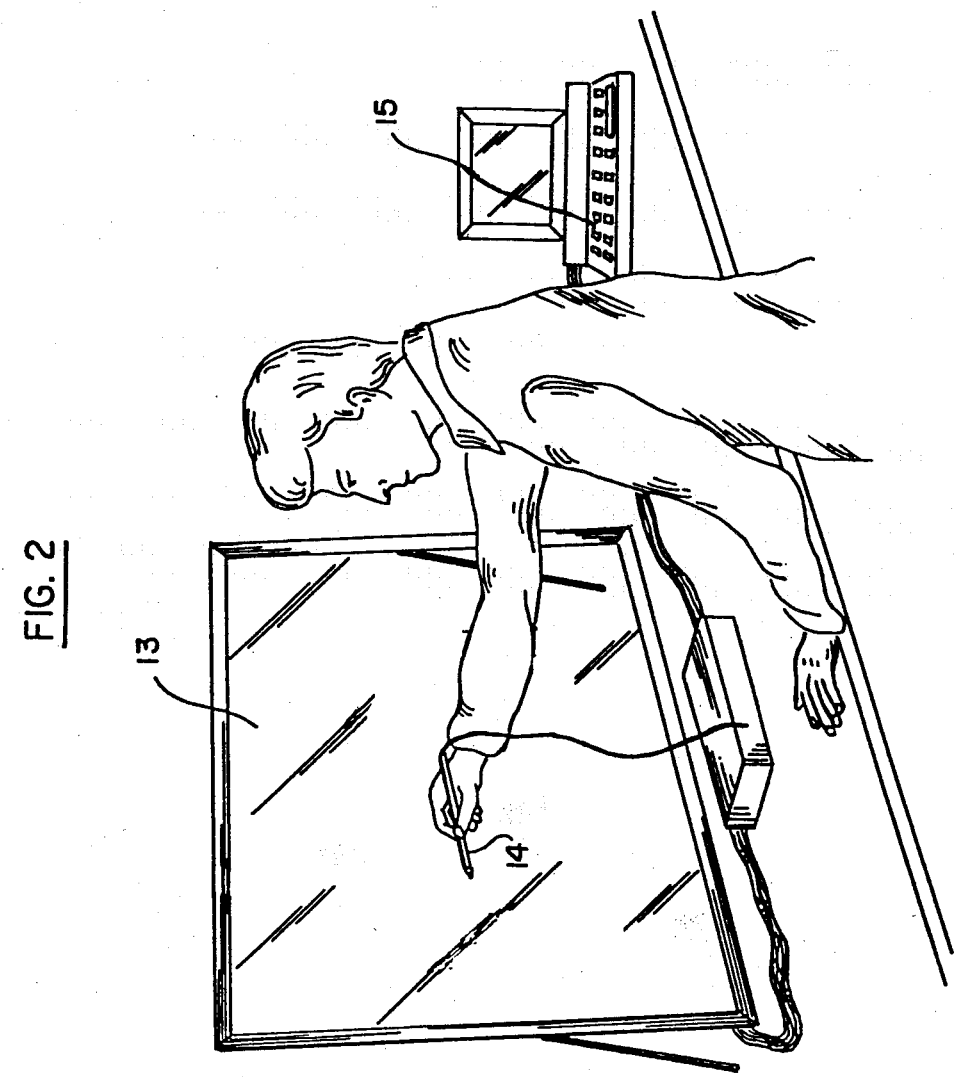
FIG. 2 shows one embodiment of the system of the invention, which includes a transparent digitizing tablet.

In operating the system of FIG. 1 in accordance with the first embodiment of the invention, the operator observes the scene viewed by camera 2 through the transparent digitizing tablet 13, as shown in FIG. 2, and moves the electronic stylus 14 about the plane surface of the tablet thereby generating digital coordinate signals that are sent to the computer 15 and processed into pan-and-tilt signals which are then sent to the pan motor and tilt motor positioner devices 12A and 12B. They, in turn, convert those digital signals into electrical currents which are sent to the pan motor drive system 3,4 and the tilt motor drive system 6,7. These drive systems respond in such a way so as to cause the motorized camera head 1 to pan and tilt in accordance with the position of the pen on the digitizing tablet 13.

Figure 3:
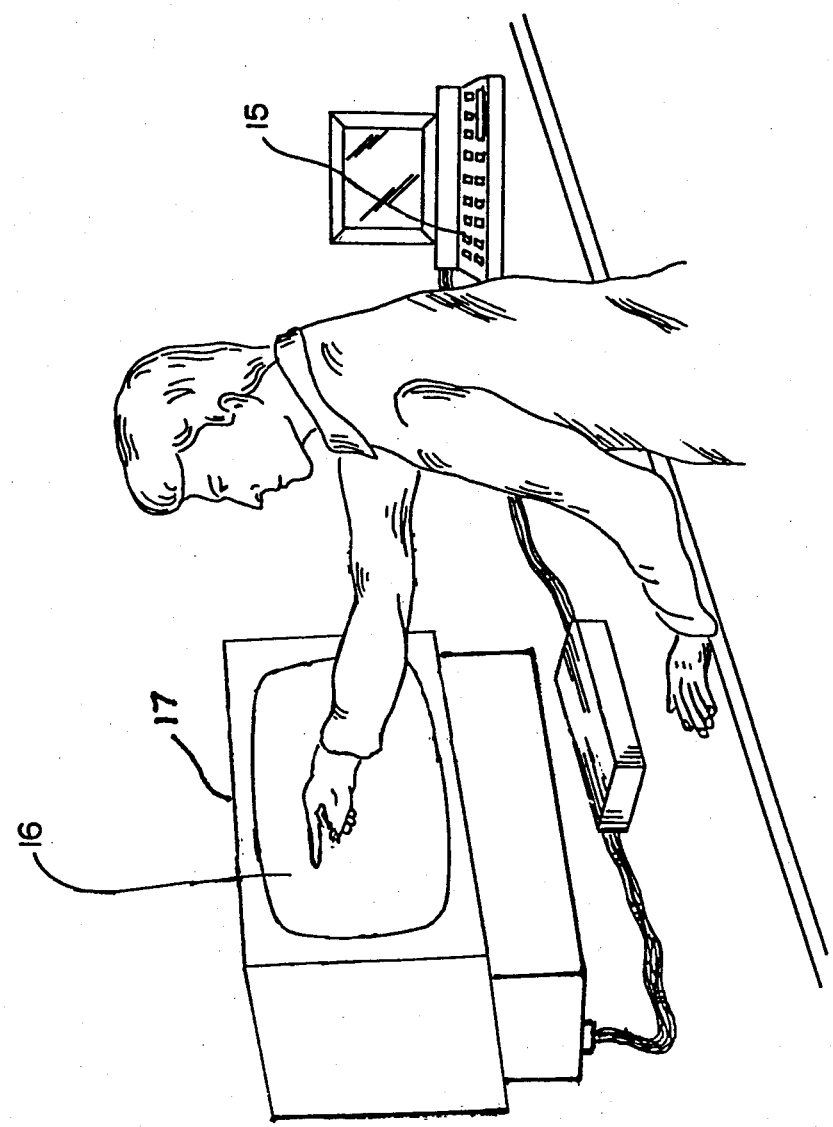
FIG. 3 shows a second embodiment which includes a monitor equipped with a digital touch screen.

The computer 15, in a second embodiment, as shown in FIG. 3, is programmed to respond to digital signals from the digital touch screen 16 of monitor 17 which receives the signals from video assist camera 10, and to perform calculations which produce corresponding pan-and-tilt signals for the motorized camera head 1 and camera 2 as determined by the location of the operator's finger on the digital touch-screen 16 of monitor 17. For example, as the operator moves his finger from the exact center of the digital touch-screen 17 of monitor 16 in any direction, the resulting digital signals generated by his finger will cause the system to pan-and-tilt camera 2 in that exact same direction. The farther he moves his finger from the center of the digital touch-screen of monitor 16 will result in greater amounts of speed given to the pan-and-tilt movement. If he removes his finger from the digital touch-screen of monitor 16, the motorized camera head 1 will stop quickly. If he returns his finger to the center of the digital touch-screen of monitor 16, the motorized camera head 1 will slow to a stop in a manner proportional to the speed of his finger as it arrives at the center of the digital touch-screen.

In the second embodiment, the operator observes the feedback monitor 16 (which carries the picture from camera 10 mounted on motorized camera head 1) and moves his finger about a digital touch-screen 17 of the monitor 16. Such a digital touch-screen, for example, may be available from the Electrographics Company of Oakridge, Tenn. The resulting digital signals generated from the touch screen are fed to the computer 15 where they are processed into digital pan-and-tilt signals and sent to the motor positioning devices 12. Those devices, as previously described, and exactly in the manner so described, convert the digital signals from the computer into electrical currents which are sent to the pan motor drive system 3,4 and the tilt motor drive system 6,7 which then cause the motorized camera head 1 to pan-and-tilt in a manner compatible with the movements of the operator's finger on the digital touch-screen of monitor 16 in accordance with the computer program governing the input and output relationships intrinsic to the total system of the invention.

It will be appreciated that although particular embodiments of the invention have been shown and described, modifications may be made. It is intended in the claims to cover all modifications which come within the spirit and scope of the invention.

I claim:

1. A computerized control system for panning and tilting a motorized camera head upon which a television, motion picture or other type of camera, is mounted, for recording a particular scene, said motorized camera head including pan and tilt drive motors, and said system comprising: transparent means including a viewing surface for viewing the actual scene being recorded and for generating digital signals representative of the required panning and tilting operations of the camera head that are required in response to manual movements across said viewing surface thereof; and a computer connected to said generating means and responsive to the digital signals therefrom for generating pan-and-tilt control signals for the motorized camera head.

2. The system defined in claim 1, in which said digital signal generating means comprises a transparent digitizing tablet through which the scene actually being recorded may be directly viewed, and an electronic stylus manually movable over the surface of the tablet to cause said tablet to generate digital signals representative of required panning and tilting operations of the camera head.

3. The system defined in claim 1, in which said system includes a monitor having a viewing screen and connected to said camera to receive picture signals from the camera to provide visual feedback on said viewing screen to the operator of the scene actually being recorded, and in which said digital signal geneating means comprises a transparent digital touch-screen mounted on the screen of the monitor, said viewing screen having a surface upon which an operator may move his finger.

4. The system defined in claim 1, and which includes two motor positioners connected respectively to the pan and tilt drive motors and connected to the computer for converting pan-and-tilt control signals from the computer into corresponding analog electrical drive currents for the pan and tilt motors.

5. The system defined in claim 1, in which said system includes a monitor connected to said camera to receive picture signals from said camera to provide visual feedback to the operator.

* * * * *